INVENTOR.
ELLSWORTH W. CARROLL

Patented Feb. 28, 1950

2,499,266

UNITED STATES PATENT OFFICE 2,499,266

FEED MECHANISM FOR FRUIT ORIENTING AND PITTING MACHINES

Ellsworth W. Carroll, Redwood City, Calif., assignor to S & W Fine Foods, Inc., San Francisco, Calif., a corporation of California Original application November 23, 1942, Serial No. 466,696. Divided and this application September 10, 1946, Serial No. 696,014

5 Claims. (Cl. 146—18)

1

My invention relates to fruit orienting and pitting machines and more particularly to a feed mechanism for such a machine.

This application is a division of my application, Serial No. 466,696, filed November 23, 1942, now United States Patent No. 2,413,861, for Single stage fruit orienting and pitting machine.

Among the objects of my invention are to provide a novel and improved feed mechanism for a machine adapted to feed individual items thereto; to provide a novel and improved feed mechanism of the drum type; to provide a novel and improved feed mechanism of the drum type for fruit, having means for periodically cleaning the apertures of crushed fruit or fruit which may be jammed therein.

Other objects of my invention will be apparent or will be specifically pointed out in the description forming a part of this specification, but I do not limit myself to the embodiment of the invention herein described, as various forms may be adopted within the scope of the claims.

Figure 1:
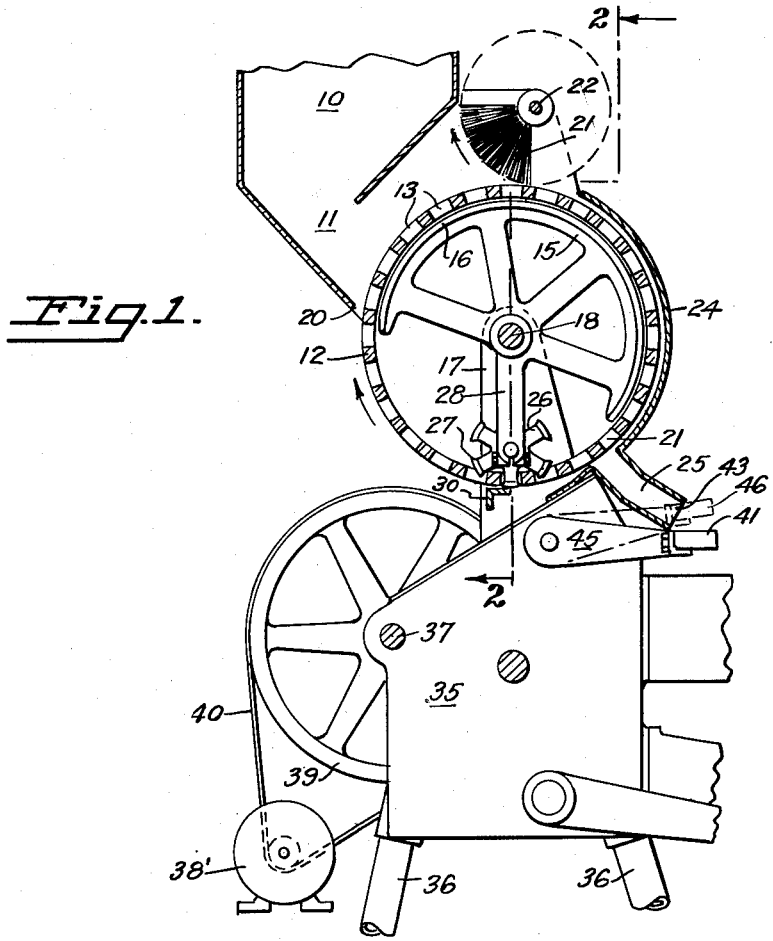
Figure 1 is a side view partly in elevation, and partly in section, of one preferred form of my invention, as applied to the single stage fruit orienting and pitting machine of my parent application.
Figure 2:
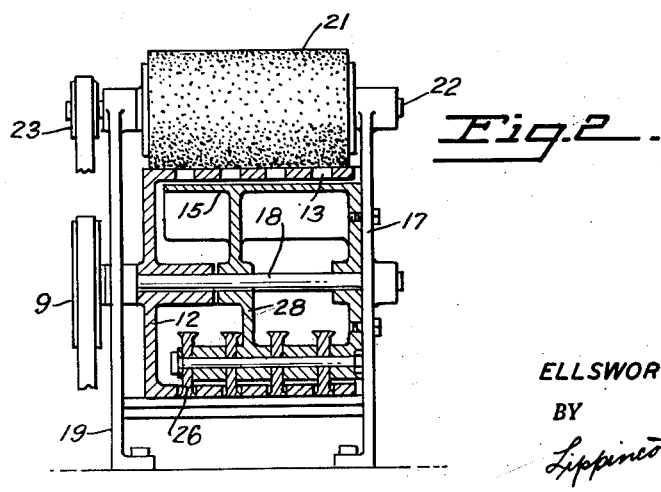
Figure 2 is a view partly in section and partly in elevation taken as indicated by the line 2—2 in Figure 1.

Referring directly to the drawings for more detailed description of my invention, a hopper 10 is provided with a lower opening 11 whereby fruit such as cherries in the hopper may come in contact with the periphery of a rotating hollow drum 12, this drum having parallel rows of fruit apertures 13 extending therethrough. Hollow drum 12 is open at one end to allow a stationary skid plate 15 to be inserted therein, this skid plate having a cylindrical surface 16 positioned adjacent the inner openings of fruit apertures 13, this skid plate being attached to side bracket 17 which also supports shaft 18 on which drum 12 is mounted. The other end of shaft 18 is mounted on opposite side bracket 19 and is rotated in a clockwise direction by pulley 9. Skid plate surface 16 is positioned beneath the apertures 13 from a line adjacent the lower edge 20 of hopper 10 around to a discharge

2 position 21, an arcuate extent of slightly more than 180°. At the top of drum 12 is positioned a brush 21 mounted on shaft 22, this brush being rotated counterclockwise by pulley 23 in order to insure the fact that only one fruit is carried around the drum 12 in each aperture 13. Outside the downwardly moving side of the drum 12, a retaining plate 24 is positioned, this retaining plate passing downwardly, spaced from and in concentric relation to the periphery of the drum to terminate in output chutes 25. Each output chute is in line with each row of apertures 13, and in a four line machine there will, of course, be four rows of apertures across the drum and four delivery chutes 25.

In order to insure that any broken or mashed fruit may be removed from the apertures 13 before they are again presented to the hopper, rotating piston gears 26 are provided having radial pistons 27 thereon entering each aperture after the aperture has passed the delivery chute. Each rotating piston gear is mounted on an arm 28 extended from skid plate 15, and is rotated by engagement of the piston 27 in apertures 13 as the drum rotates. As each piston 27 enters an aperture 13 fully it closely approaches a stationary scraper bar 30 positioned at the bottom of the drum 12 so that all material pushed out of the apertures by the pistons will be scraped from the end of the pistons. One piston gear 26 is provided for each row of apertures.

Side bracket 17 and opposite side bracket 19 which support shaft 18 on which drum 12 rotates, are attached to a gear box 35 forming the main body of the device and containing the various synchronized gears, cams, etc., to operate the machine, such mechanical arrangements being well known in the art and, therefore, neither shown nor described. Gear box 35 is supported on legs 36 to raise the machine sufficiently off the floor to allow proper discharge of the fruit. Gear box 35 is energized by a large pulley 39 driving through a power shaft 37. Main pulley 39 is driven in any convenient manner, such as by a motor 38' and belt 40.

Immediately below the outlet of each of the chutes 25 is positioned a horizontal fence bar 41. This fence bar in the machine of my parent application, has therein a plurality of fruit retaining apertures, one of these apertures being positioned immediately below the outlet opening 43 of each chute, so that as the cherries roll down the chute, if the bar 41 is in proper position, they roll into such apertures. Bar 41 in the machine of my parent application, constitutes part of fruit orientation mechanism, but may broadly be receptacles for any desired purpose, and is normally maintained in level position by bar-actuating side arms 45 operated from within the gear box, these arms being capable of raising bar 41 upwardly to block the outlet openings 43 of the chutes 25 as shown by the broken line position 46 in Figure 1.

Having above described the construction of my machine, I will next describe the operation of this particular modification. Fruit such as cherries are fed in bulk into hopper 10 and fall into apertures 13 in drum 12 and are carried around in a clockwise direction until they meet brush 21 which is rotating in a counter-clockwise direction. Brush 21 is adjusted to brush off all extra fruit so that only one fruit is in each aperture 13. The fruit is then carried around the drum until it reaches a position adjacent the output chutes 25. As the fruit is discharged from the drum into output chutes, the gearing in the gear box is adjusted so that the fence bar is in upper position 46, thus holding the fruit at the end of the chute. Thus, I do not depend for timing on the fruit rolling down through chute 25 or on any accurate release of the fruit from apertures 13. Consequently, drum 12 may be continuously rotated. At a certain time, as predetermined by the machinery within the gear box 35, the fence bar 41 lowers to horizontal position and the fruit held in the chutes 25 drops into the fence apertures.

While I have illustrated and described one specific embodiment of my invention in considerable detail, the same is subject to modification and alteration without departing from the underlying principles of the invention, and I, accordingly, do not desire to be limited in my protection to such specific details except as may be necessitated by the appended claims.

I claim:

1. Feed mechanism for a machine, comprising a rotatable feed drum having a plurality of peripheral rows of apertures therein to receive items to be fed to such machine from above, a skid plate positioned adjacent the periphery of said drum holding said items in said apertures as said periphery moves downwardly, and terminating beneath said drum, a chute positioned to receive items falling by gravity from said apertures after release therefrom by termination of said skid plate, and a rotatable wheel positioned inside said drum in line with each peripheral row of said apertures, each said wheel including a plurality of radially extending pistons spaced to enter successive apertures of an associated row in response to rotation of said drum, each of said pistons having a length sufficient to reach the outer surface of said drum, and a scraper disposed adjacent the periphery of said drum at a location where the pistons reach the outer surface thereof, said location being on said periphery after said apertures clear said chute, and before said apertures are re-fed with said items.

2. Feed mechanism for a machine, comprising a rotatable feed drum having a peripheral row of apertures therein of a cross-section to receive single items to be fed to such machine from above, a skid plate positioned adjacent the periphery of said drum holding said items in said apertures as said periphery moves downwardly, and terminating beneath said drum, a chute positioned to receive items falling by gravity from said apertures after release therefrom by termination of said skid plate, a rotatable wheel positioned inside said drum in line with said peripheral row of apertures, said wheel including a plurality of radially extending pistons spaced to enter successive apertures of said row as said drum is rotated, each of said pistons having a length sufficient to reach the outer surface of said drum, said pistons being timed to reach the outer surface of said drum after release of said items from said apertures, and a scraper disposed closely adjacent the outer surface of said drum at the location where the pistons reach the outer surface thereof.

3. Feed mechanism for a machine, comprising a rotatable feed drum having a plurality of peripheral rows of apertures therein of a cross-section to receive single items to be fed to such machine from above, a skid plate positioned adjacent the periphery of said drum holding said items in said apertures as said periphery moves downwardly, and terminating beneath said drum, a chute positioned to receive items falling by gravity from said apertures after release therefrom by termination of said skid plate, a rotatable wheel positioned inside said drum in line with each peripheral row of said apertures, each such wheel including a plurality of radially extending pistons spaced to enter successive apertures of an associated row as said drum is rotated, each of said pistons having a length sufficient to reach the outer surface of said drum, said pistons being timed to reach the outer surface of said drum after release of said items from said apertures, and a scraper disposed closely adjacent the outer surface of said drum at the location where the pistons reach the outer surface thereof.

4. Feed mechanism for a machine, comprising a rotatable feed drum having a plurality of peripheral rows of apertures therein of a cross-section to receive single items to be fed to such machine, a source of supply of such items adjacent said drum, a discharge chute adjacent said drum at each row of apertures and at a location permitting gravity discharge of items from said apertures into said chutes, means for holding said items in said apertures until such occupied apertures reach such location of discharge, and a rotatable wheel positioned inside said drum in line with each peripheral row of said apertures, each such wheel including a plurality of radially extending pistons spaced to enter and substantially fill successive apertures of an associated row as said drum is rotated, each of said pistons having a length sufficient to reach the outer surface of said drum, and positioned to reach said outer surface at a point beyond the discharge points of said items, and a scraper positioned adjacent the periphery of said drum at that point to remove item parts cleared from said apertures by said pistons.

5. In combination, a rotatable drum having a plurality of peripheral apertures therein, means for loading items into said apertures on the top of said drum, means for holding items in said apertures as said drum is rotated downwardly, said latter means terminating below said drum to release items in said apertures for gravity discharge therefrom, means for receiving discharged items, a wheel positioned within said drum and having a plurality of radially extending arms serially enterable into said apertures as said drum revolves and extending to the peripheral surface of said drum in said apertures at a point beyond the discharge point of said items, said arms having an outer surface thereon shaped to substantially fit said aperture when at the periphery of said drum, and a stationary scraper positioned to closely approach said surface and said periphery when said arm surface is at the periphery of said drum to remove item fragments from said arm surface cleared from said aperture by passage of said surface therethrough.

ELLSWORTH W. CARROLL.

REFERENCES CITED

The following references are of record in the file of this patent:

UNITED STATES PATENTS

| Number | Name | Date |
| --- | --- | --- |
| 1,024,564 | Foote | Apr. 30, 1912 |
| 1,422,798 | Thompson | July 11, 1922 |
| 1,701,533 | Howson | Feb. 12, 1929 |
| 1,726,719 | Schau | Sept. 3, 1929 |
| 2,152,107 | Thompson | Mar. 28, 1939 |
| 2,169,353 | Carroll | Aug. 15, 1939 |
| 2,271,675 | Ashlock, Jr. | Feb. 3, 1942 |